US010055753B2

(12) United States Patent
Kozareva et al.

(10) Patent No.: US 10,055,753 B2
(45) Date of Patent: Aug. 21, 2018

(54) SYSTEMS AND METHODS FOR INSTANT GENERATION OF HUMAN UNDERSTANDABLE AUDIENCE INSIGHTS

(71) Applicant: Yahoo Holdings, Inc., Sunnyvale, CA (US)

(72) Inventors: Zornitsa Kozareva, Santa Clara, CA (US); Lin Ma, Sunnyvale, CA (US); Rohit Bhatia, Sunnyvale, CA (US)

(73) Assignee: Oath Inc., New York, NY (US)

( * ) Notice: Subject to any disclaimer, the term of this patent is extended or adjusted under 35 U.S.C. 154(b) by 612 days.

(21) Appl. No.: 14/634,463

(22) Filed: Feb. 27, 2015

(65) Prior Publication Data

US 2016/0253694 A1    Sep. 1, 2016

(51) Int. Cl.
*G06Q 30/00*    (2012.01)
*G06Q 30/02*    (2012.01)
*G06Q 50/00*    (2012.01)

(52) U.S. Cl.
CPC ......... *G06Q 30/0242* (2013.01); *G06Q 50/01* (2013.01)

(58) Field of Classification Search
CPC ................................................. G06Q 30/0241
USPC .......................................................... 705/14
See application file for complete search history.

(56) References Cited

U.S. PATENT DOCUMENTS

| | | | | |
|---|---|---|---|---|
| 5,870,746 A * | 2/1999 | Knutson | ........... | G06F 17/30554 |
| 8,671,011 B1 * | 3/2014 | Merryman | ......... | G06Q 30/0244 |
| | | | | 705/14.41 |
| 2004/0103051 A1 * | 5/2004 | Reed | ...................... | G06Q 30/02 |
| | | | | 705/36 R |
| 2012/0232956 A1 * | 9/2012 | Dilip | ...................... | G06Q 30/02 |
| | | | | 705/7.33 |
| 2012/0265609 A1 * | 10/2012 | Robert | ............... | G06Q 30/0257 |
| | | | | 705/14.49 |
| 2014/0280549 A1 * | 9/2014 | Rajan | .................... | H04L 67/306 |
| | | | | 709/204 |
| 2015/0150033 A1 * | 5/2015 | Law | ................. | H04N 21/44204 |
| | | | | 725/14 |
| 2015/0235246 A1 * | 8/2015 | Benis | ................. | G06Q 30/0204 |
| | | | | 705/7.33 |
| 2015/0334458 A1 * | 11/2015 | Srinivasan | ........... | H04N 21/482 |
| | | | | 725/14 |
| 2016/0103822 A1 * | 4/2016 | George | .............. | G06Q 30/0204 |
| | | | | 704/9 |

* cited by examiner

*Primary Examiner* — Matthew L Hamilton
(74) *Attorney, Agent, or Firm* — Cooper Legal Group, LLC

(57) ABSTRACT

Systems and methods for generating human readable natural language summary for campaign audience are provided. The system includes a memory storing a database including audience segments and tags related to the audience segments. A computer server is in communication with the memory and the database, the computer server programmed to: obtain campaign delivery feed data related to a plurality of campaigns from at least one advertiser in a preset time period; obtain audience feed data including tag information from a data provider; cluster the tag information to find term frequencies for each term in the tag information; identify human understandable terms from the clustered tag information by removing noisy terms; and generate a human understandable report using the human understandable terms in a timely fashion.

12 Claims, 7 Drawing Sheets

SYSTEMS AND METHODS FOR INSTANT GENERATION OF HUMAN UNDERSTANDABLE AUDIENCE INSIGHTS

BACKGROUND

The Internet is a ubiquitous medium of communication in most parts of the world. The emergence of the Internet has opened a new forum for the creation and placement of advertisements (ads) promoting products, services, and brands. Internet content providers rely on advertising revenue to drive the production of free or low cost content. Advertisers, in turn, increasingly view Internet content portals and online publications as a critically important medium for the placement of advertisements.

In online marketing and online advertising, a target audience is a specific group of people within the target market at which a product or the marketing message of a product is aimed. For example, if a company sells new sports shoes for boys (target market) the online advertising may be aimed at the parents (target audience) who take care of shopping for their kids. Generally, a target audience may be selected based on factors including: age group, gender, marital status, etc. The target audience, however, may be different from the successful audience, which include the group of users who actually performed the preset action after viewing the marketing message. Different organizations and different people involved in the online advertising industry may tag different audience with different conventions. As a result, the tags for different audience segments from different organizations may be nearly impossible to understand by the advertisers.

Because the different format of the audience tags are generally complicated and arbitrary, the existing online advertisement systems are not capable to provide advertisers a human understandable summary without human intervention. Thus, there is a need to develop methods and systems to help advertisers to understand more about their audience.

SUMMARY

Different from conventional solutions, the disclosed system solves the above problem by automatically generating human understandable report about the campaign audiences using audience tag information from different sources across different platforms.

In a first aspect, the embodiments disclose a computer system that includes a processor and a non-transitory storage medium accessible to the processor. The system also includes a memory storing a database including segment data and campaign data. A computer server is in communication with the memory and the database, the computer server programmed to: obtain campaign delivery feed data related to a plurality of campaigns from at least one advertiser in a preset time period; obtain audience feed data including tag information from a data provider; cluster the tag information to find term frequencies for each term in the tag information; identify human understandable terms from the clustered tag information by removing noisy terms; and generate a human understandable report using the human understandable terms in a timely fashion.

In a second aspect, the embodiments disclose a computer implemented method by a system that includes one or more devices having a processor. In the computer implemented method, the system obtains campaign delivery feed data related to a plurality of campaigns from at least one advertiser in a preset time period. The system obtains audience feed data including tag information from a data provider. The system clusters the tag information to find term frequencies for each term in the tag information. The system identifies human understandable terms from the clustered tag information by removing noisy terms. The system selects a template based on the human understandable terms and combines the template with the human understandable terms to generate a human understandable report in a timely fashion.

In a third aspect, the embodiments disclose a non-transitory storage medium configured to store a set of modules. The non-transitory storage medium includes a module for obtaining campaign delivery feed data related to a plurality of campaigns from at least one advertiser in a preset time period, where the campaign delivery feed data include user identifications. The non-transitory storage medium further includes a module for obtaining audience feed data comprising tag information from a data provider using the user identifications. The non-transitory storage medium further includes a module for clustering the tag information to find term frequencies for each term in the tag information. The non-transitory storage medium further includes a module for identifying human understandable terms from the clustered tag information by removing noisy terms. The non-transitory storage medium further includes a module for generating a human understandable report using the human understandable terms in a timely fashion.

DETAILED DESCRIPTION OF THE DRAWINGS

Figure 1:
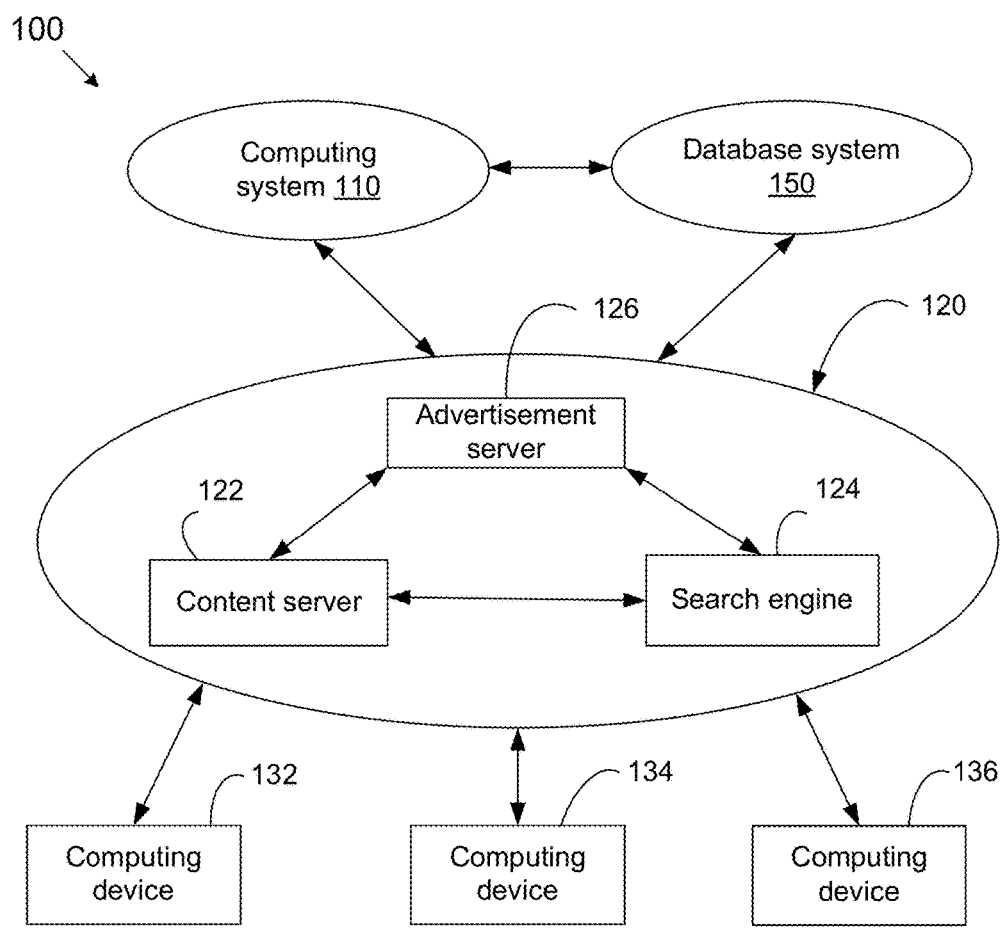
FIG. 1 is a block diagram of an example environment in which a computer system according to embodiments of the disclosure may operate.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

While the publisher and social networks collect more and more user data through different types of e-commerce applications, news applications, games, social networks applications, and other mobile applications on different mobile devices, a user may by tagged with different features accordingly. Using these different tagged features, online advertising providers may create more and more audience segments to meet the different targeting goals of different advertisers. Thus, it is desirable for advertisers to directly select the audience segments with the best performances using keywords. Further, it would be desirable to the online advertising providers to provide more efficient services to the advertisers so that the advertisers can select the audience segments without reading through the different features or descriptions of the audience segments. The present disclosure provides a computer system that uses keyword vectors to represent an audience segment and provides intuitive user interfaces to allow advertisers to use keywords to search for any audience segments.

FIG. 1 is a block diagram of an environment 100 in which a computer system according to embodiments of the disclosure may operate. However, it should be appreciated that the systems and methods described below are not limited to use with the particular exemplary environment 100 shown in FIG. 1 but may be extended to a wide variety of implementations.

The environment 100 may include a computing system 110 and a connected server system 120 including a content server 122, a search engine 124, and an advertisement server 126. The computing system 110 may include a cloud computing environment or other computer servers. The server system 120 may include additional servers for additional computing or service purposes. For example, the server system 120 may include servers for social networks, online shopping sites, and any other online services.

The content server 122 may be a computer, a server, or any other computing device known in the art, or the content server 122 may be a computer program, instructions, and/or software code stored on a computer-readable storage medium that runs on a processor of a single server, a plurality of servers, or any other type of computing device known in the art. The content server 122 delivers content, such as a web page, using the Hypertext Transfer Protocol and/or other protocols. The content server 122 may also be a virtual machine running a program that delivers content.

The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 is designed to help users find information located on the Internet or an intranet.

The advertisement server 126 may be a computer system, one or more computer servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 is designed to provide digital ads to a web user based on display conditions requested by the advertiser. The advertisement server 126 may include computer servers for providing ads to different platforms and websites.

The computing system 110 and the connected server system 120 have access to a database system 150. The database system 150 may include memory such as disk memory or semiconductor memory to implement one or more databases. At least one of the databases in the database system may be a campaign database that stores information related to a plurality of campaign delivery feeds. The campaign delivery feeds may include impressions, conversions, video views, or other events performed on the marketing message. The campaign delivery feeds are generally created near real time right after the events are performed. For example, a publisher like Yahoo! may generate millions of campaign delivery feeds per minute and the data size of the campaign delivery feeds may be greater than one gigabytes during one second. Thus, it is nearly impossible for current computer system to generate a report letter without human supervision. At the same time, human supervision cannot keep up with the pace of the huge amount of campaign delivery feeds data.

At least one of the databases in the database system may be a user database that stores information related to audience feeds related to a plurality of users. The user database may be affiliated with a data provider. The amount of audience feeds data may be greater than the amount of data of the corresponding campaign delivery feeds. The audience feeds may include all information related to a specific user from different data sources including: the publisher, the advertiser, or any other third parties such as a social network. For example, the record file may include personal information of the user, search histories of the user from the search engine 124, web browsing histories of the user from the content server 122, or any other information the user agreed to share with a data provider. Because the audience feeds may be created by different publishers on different platforms, the audience feeds may be marked differently across different publishers and platforms. Thus, there is a need to develop a computer system that can identify the human understandable information from the huge amount of audience feeds data.

The environment 100 may further include a plurality of computing devices 132, 134, and 136. The computing devices may be a computer, a smart phone, a personal digital aid, a digital reader, a Global Positioning System (GPS) receiver, or any other device that may be used to access the Internet.

The disclosed system and method for generating human readable natural language summary may be implemented by the computing system 110. Alternatively or additionally, the system and method for generating human readable natural language summary may be implemented by one or more of the servers in the server system 120. The disclosed system may instruct the computing devices 132, 134, and 136 to display all or part of the human readable natural language summary. The disclosed system may also instruct the computing devices 132, 134, and 136 to display multiple human readable natural language summaries generated at different times.

Generally, an advertiser or any other user may use a computing device such as computing devices 132, 134, and 136 to access information on the server system 120 and the data in the database 150. The advertiser may want to learn the insights about customers who like their ads or customers who performed a preset action to the marketing message. One of the technical problems solved by the disclosure is a lack of robust and reliable method to automatically generate a human readable summary integrating the intelligence from all data providers. Conventional campaign setup requires substantial human interaction to generate such a report. The disclosed solution increases the efficiency of summarizing attributes of successful campaign. Thus, the disclosed computer system may automatically generate human readable audience summaries for all successful campaigns in a timely fashion. The advertisers may take advantage of the human readable audience summaries and adjust or expand the target audiences.

Further, the system solves technical problems presented by managing large amounts of user data represented by different user features collected by all types of data providers. Through processing collected data, the system clusters the audience data to find the non-meaningful part of the segment tags. The system may then remove the non-meaningful part from the segment tags. The remaining part of the segment tags will only include the meaningful part.

The system provides a scalable solution to summarize the audience segment from different audience feeds. The system further generates a summary report that includes user daily habit attribute. The scalable solution can summarize all kinds of display campaigns and provide timely reports for all user qualified audience segments including every impressions, clicks and conversions.

Figure 2:
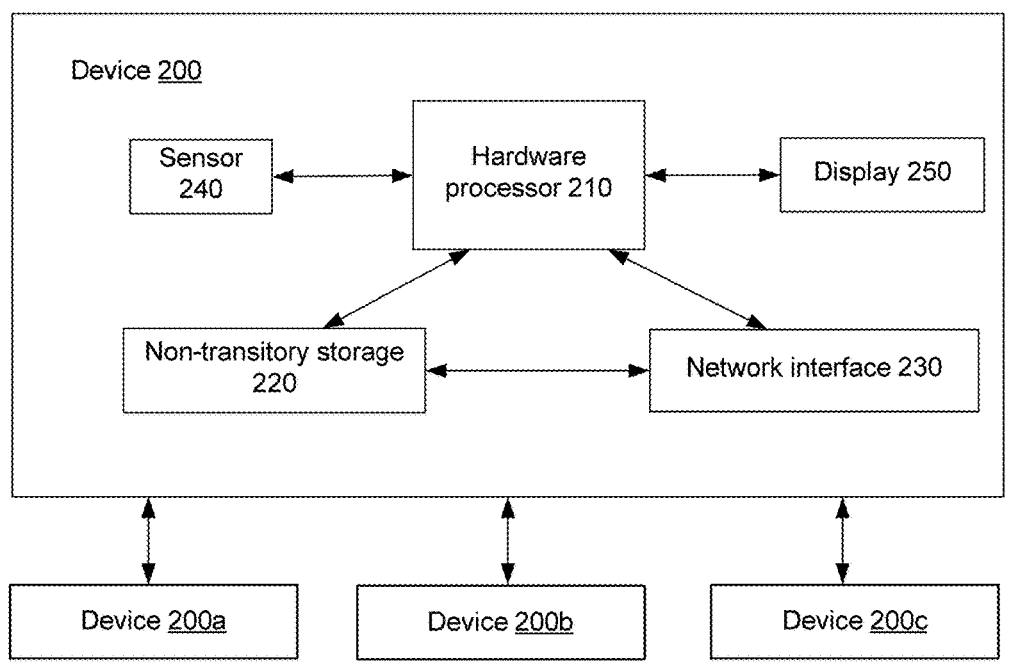
FIG. 2 illustrates an example computing device in the computer system.

FIG. 2 illustrates an example computing device 200 for interacting with the advertiser. The computing device 200 may communicate with a frontend computer server of the system. The computing device 200 may be a computer, a smartphone, a server, a terminal device, or any other computing device including a hardware processor 210, a non-transitory storage medium 220, and a network interface 230. The hardware processor 210 accesses the programs and data stored in the non-transitory storage medium 220. The device 200 may further include at least one sensor 240, circuits, and other electronic components. The device may communicate with other devices 200a, 200b, and 200c via the network interface 230.

The computing device 200 may display user interfaces on a display unit 250. For example, the computing device 200 may display a user interface on the display unit 250 asking the advertiser to input one or more identifications of a campaign. The user interface may provide checkboxes, dropdown selections or other types of graphical user interfaces for the advertiser to select geographical information, demographical information, mobile application information, technology information, publisher information, or other information related to an online campaign.

The computing device 200 may further display the generated audience summary. The computing device 200 may also display one or more drawings or figures that have different formats such as bar charts, pie charts, trend lines, area charts, etc. The drawings and figures may represent the successful audience segments and/or the performance of one or more successful audience segments.

Figure 3:
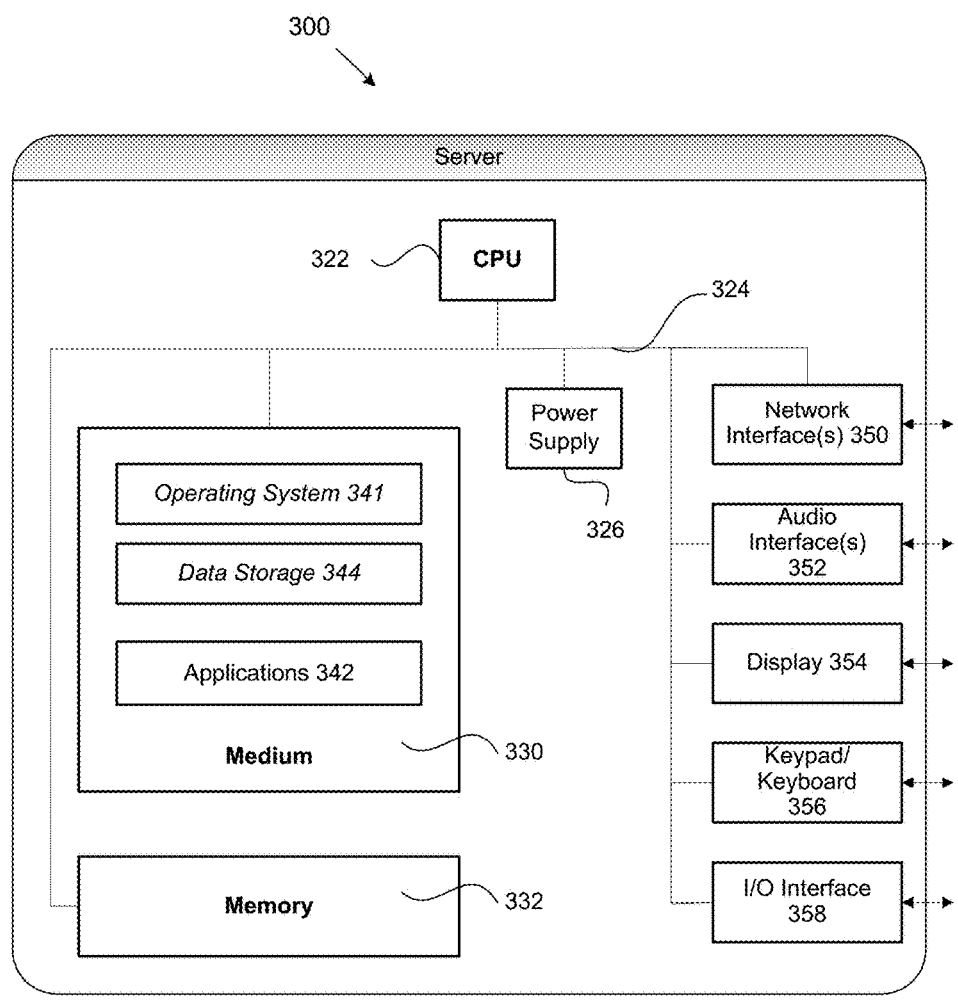
FIG. 3 illustrates an example embodiment of a server computer.

FIG. 3 is a schematic diagram illustrating an example embodiment of a server. A server 300 may include different hardware configurations or capabilities. For example, a server 300 may include one or more central processing units 322, memory 332 that is accessible to the one or more central processing units 322, one or more medium 330 (such as one or more mass storage devices) that store application programs 342 or data 344, one or more power supplies 326, one or more wired or wireless network interfaces 350, one or more input/output interfaces 358. The memory 332 may include non-transitory storage memory and transitory storage memory.

A server 300 may also include one or more operating systems 341, such as Windows Server, Mac OS X, Unix, Linux, FreeBSD, or the like. Thus, a server 300 may include, as examples, dedicated rack-mounted servers, desktop computers, laptop computers, set top boxes, integrated devices combining various features, such as two or more features of the foregoing devices, or the like.

The server 300 in FIG. 3 may serve as any computer server shown in FIG. 1. The server 300 may also serve as a computer server that implements the computer system for generating human readable natural language summary. In either case, the server 300 is in communication with a database that stores segment data and campaign data. The segment data may include different audience segments built on search data, email data, page view data, TV data, mobile application data, social data, and etc. collected by different data providers. The campaign data may include creative landing uniform resource locator (URL), advertiser name, advertiser product, competitor information, campaign slogan, or other meta-data related to a campaign.

For example, the segment data may include at least the following data related to the underlying product or service:

the age group of the audience, the income range of the audience, the geographical location of main residence, the spending range in a preset time period, the TV provider of the audience, and the number of friends in one or more social networks. These aspects may represent campaign features collected from search data, content data, email data, and social areas. The campaign data may include both history campaign data and campaign data of currently running campaigns.

The segment data may be identified by segment names or other segment identification. The segment names may be given by engineers, data providers, researchers, business managers, or any other people in the business team and data operation team. The segment names may be used to tag users in different segments. Thus, the segment names are a good reference for audience attributes in each of the segments. However, most audience segments are generally only understandable to the original people who build the audience segments. In other words, the name may be noisy with specific technical terms or private terms, which may be hard to understand by the advertisers or a third party because there is no universal rules for setting the segment names. This present a technical problem to identify the attributes that matters to advertisers from the segment names.

The server 300 is programmed to obtain campaign delivery feed data related to a plurality of campaigns from at least one advertiser in a preset time period; obtain audience feed data including tag information from a data provider; cluster the tag information to find term frequencies for each term in the tag information; identify human understandable terms from the clustered tag information by removing noisy terms; and generate a human understandable report using the human understandable terms in a timely fashion.

For example, the server 300 may be programmed to obtain campaign delivery feed data related to a plurality of campaigns from at least one advertiser in a preset time period, where the preset time period may a minute, an hour, or any other preset time period according to advertiser needs and/or server setup. The campaign delivery feed data may be first collected at a mobile device and then transmitted to a server computer via a network connection. The campaign delivery feed data may include user identifications. In that case, the server 300 may obtain user identifications using the campaign delivery feed data related to the plurality of campaigns from at least one advertiser. The user identifications may be a code that is configured to conceal personal identification information of the users. For example, the code may be a pure digital code, a partially digital code, or any other code only understandable by a computing device.

After receiving the user identifications, the server 300 is programmed to obtain audience feed data including tag information from a data provider. The data provider may include a social network, an advertiser, a search engine, a publisher, or anyone who collects or provides user data with the user identifications. The data provider may divide the audiences to audience segments and give each audience segment an audience segment name. The tag information may include the audience segment names corresponding to the user identifications.

After obtaining the tag corresponding to the user identifications, the server 300 is programmed to cluster the tag information to find term frequencies for each term in the tag information. The server 300 may cluster all audience segments together and divide the audience segments to different clusters such that each cluster includes at least one high-frequency term based on the term frequencies. For example, the audience segments may be divided to 500 clusters with each cluster include one high-frequency term. The high-frequency term is very likely to be given by the data provider and should be treated as a noisy term. If the data provider provides certain information about their own rules of giving audience names, the server 300 may create a black-list that includes the terms based on the information. For example, the black-list may include an agency name of the data provider, which is included in all tags from the agency.

The server 300 is programmed to identify human understandable terms from the clustered tag information by removing noisy. For example, the noisy terms may include the high-frequency term in each cluster and other terms in the black-list. After removing the noisy terms, the server 300 may find the remaining part of the tags to be human understandable terms. The computer server may detect a meaningful part in the clustered tag information by using the regular expression to remove a non-meaningful part in the clustered tag information.

The server 300 is programmed to generate a human understandable report using the human understandable terms in a timely fashion. For example, the server 300 may generate the human understandable report by inserting the human understandable terms and the meaningful part into a report template. The report template may be created for different advertisers beforehand based on historical reports.

Figure 4:
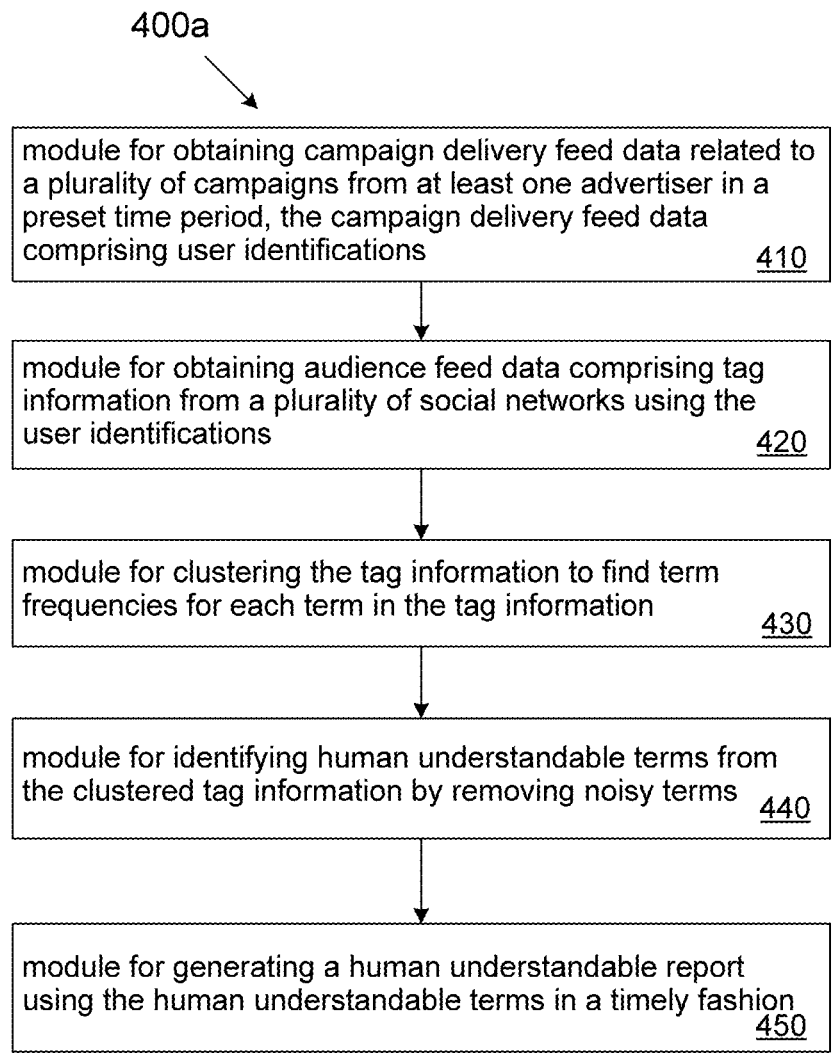
FIG. 4 is an example block diagram illustrating embodiments of the non-transitory storage of the server computer.

FIG. 4 illustrates embodiments of a non-transitory storage medium 400a in the server 300 illustrated in FIG. 3. The non-transitory storage medium 400a includes one or more modules. The one or more modules may be implemented as program code and data stored on the non-transitory storage medium, for example. The non-transitory storage medium 400a may include alternative, additional or fewer modules in other embodiments. The non-transitory storage medium 400a includes a module for recording data in a database.

The non-transitory storage medium 400a includes a module 410 for obtaining campaign delivery feed data related to a plurality of campaigns from at least one advertiser in a preset time period, where the campaign delivery feed data include user identifications. The user identifications may be encrypted and only understandable by a preset device during the preset time period. The encryption may include any known encryption algorithm. In addition, the encryption may be tied to a transaction time of the underlying transaction or conversion related to the marketing message.

The non-transitory storage medium 400a includes a module 420 for obtaining audience feed data including tag information from a data provider, which may include a plurality of social networks using the user identifications. The data provider may be affiliated with the advertiser or the publisher or a third party independent data provider. The data provider may collect user activities performed online and/or offline and divide the users to different audience segments based on the collected data and/or other criteria.

The non-transitory storage medium 400a includes a module 430 for clustering the tag information to find term frequencies for each term in the tag information. For example, a server may use clustering and/or machine learning technologies to extract meaningful part from audience names and remove noisy part from the names. The server may use the meaningful part of the names to generate a human readable report. The server may divide the audience names to a plurality of clusters using the high frequency terms to do clustering such that each cluster includes at least one high-frequency term.

The non-transitory storage medium 400a includes a module 440 for identifying human understandable terms from the clustered tag information by removing the noisy terms that are not global. To do this, the server may need to identify the noisy terms that are not global within a cluster using the term frequencies for each term in the cluster.

The non-transitory storage medium 400a may further include a module 450 for generating a human understandable report using the human understandable terms in a timely fashion. A server may generate the human understandable report by combining a template with the human understandable terms. Generally, server may generate the report at a preset time interval, which may be an hour, a few hours, or any other time period within the computation limit of the servers.

Figure 5:
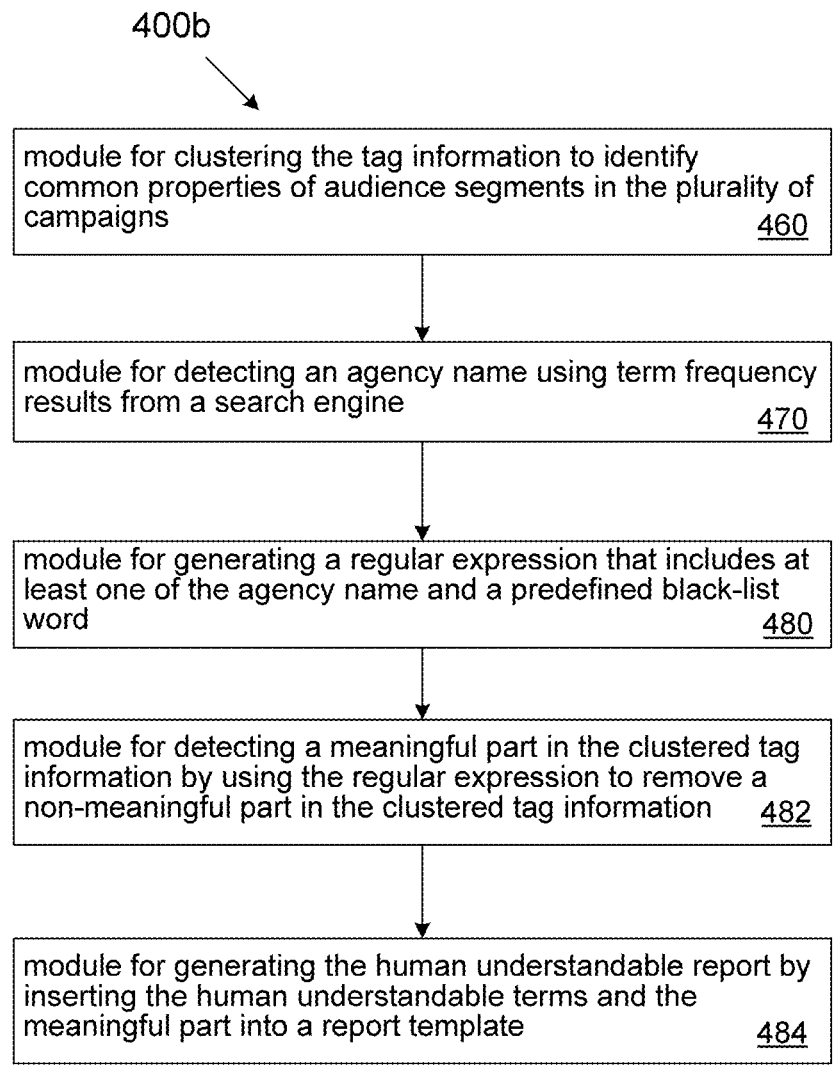
FIG. 5 is an example block diagram illustrating embodiments of the non-transitory storage of the server computer.

FIG. 5 illustrates embodiments of a non-transitory storage medium 400b in the server 300 illustrated in FIG. 3. The non-transitory storage medium 400b may further include a module 460 for clustering the tag information to identify common properties of audience segments in the plurality of campaigns. For example, a server may user clustering to identify most people in the successful audience segments like travelling, while "traveling" are one of the common properties. The common properties may include a plurality of terms including: traveling, shoppers, automotive, shopper, finance, retail, destinations, brand, converters, cat, demographics, driving course, minus converters, entertainment, auto, consumer package goods, apparel, etc.

The non-transitory storage medium 400b includes a module 470 for detecting an agency name using term frequency results from a search engine. In each cluster characterized by at least one of the common properties, the server may try to identify agency names and remove the identified agency names because they are not useful to the advertisers.

The non-transitory storage medium 400b includes a module 480 for generating a regular expression that includes at least one of the agency name and a predefined black-list word. To remove the noisy terms in the cluster, the server may generate a regular expression by finding n-gram inside a segment name, which occurs more than N times. Here, n-gram may be a contiguous sequence of n items from a given sequence of text such as the segment name. The regular expression may include a "*" and non-meaningful parts, where the non-meaningful parts may be detected by the search engine or selected from a preset black-list word filter.

The non-transitory storage medium 400b includes a module 482 for detecting a meaningful part in the clustered tag information by using the regular expression to remove a non-meaningful part in the clustered tag information. For example, the server may detect the string "E2E Test" as a non-meaningful part. The server may then generate a regular expression "*E2E Test*" to match the segment names. When the full segment name is "P&G E2E Test," the part that does not match the regular expression is "P&G," which is identified as the meaningful part.

The non-transitory storage medium 400b may include a module 484 for generating the human understandable report by inserting the human understandable terms and the meaningful part into a report template. The module 484 may store a plurality of templates for different industries or different advertisers. The templates may be created based at least partially based on human input from advertisers, publishers, or data providers. The templates may be updated periodically based on learned information from the audience feeds of successful campaigns.

Figure 6:
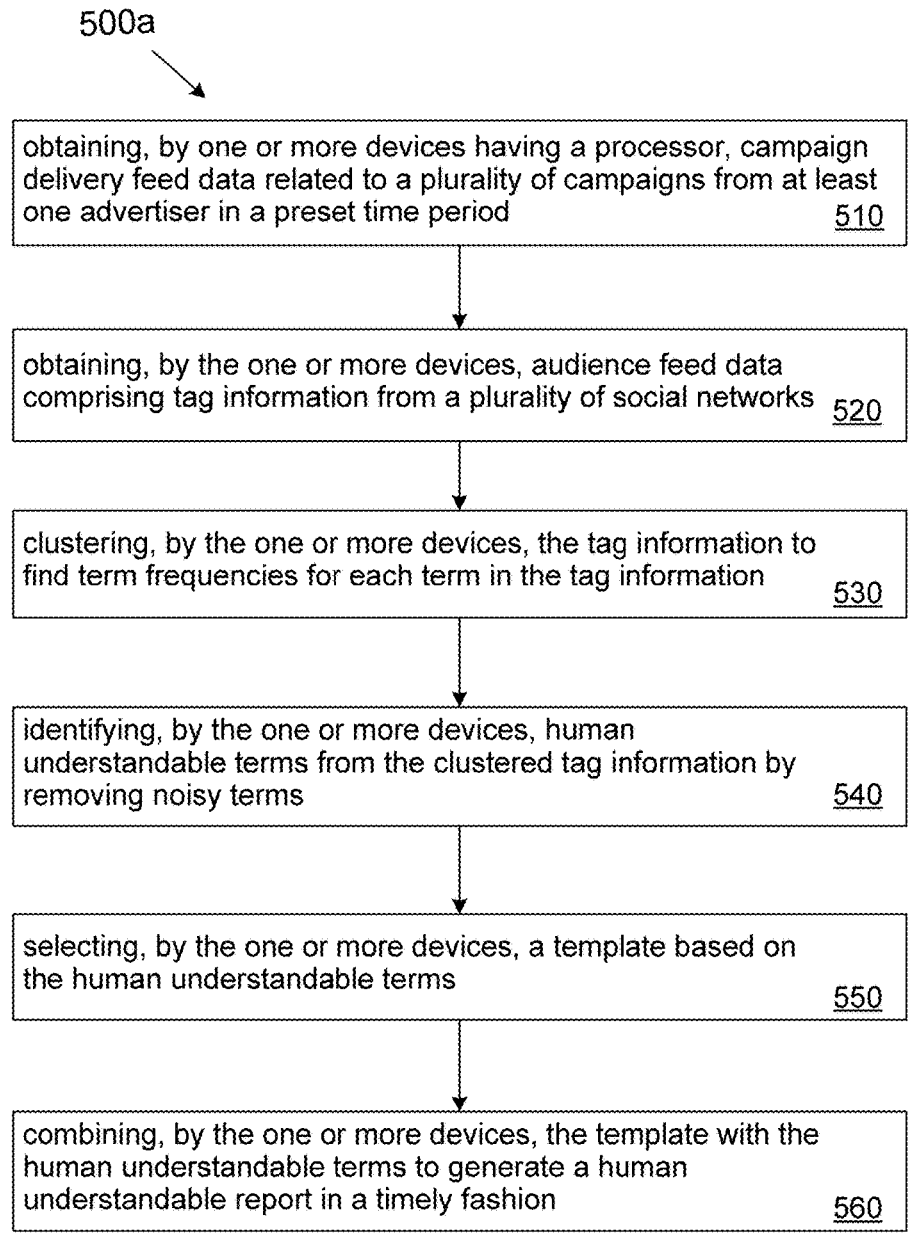
FIG. 6 is an example flow diagram illustrating embodiments of the disclosure.

FIG. 6 is an example flow diagram 500a illustrating embodiments of the disclosure. The flow diagram 500a may be implemented at least partially by a computer system that includes a computer server 300 having a processor or computer and illustrated in FIG. 3. The computer implemented method according to the example block diagram 500a includes the following acts. Other acts may be added or substituted.

In act 510, the computer system obtains campaign delivery feed data related to a plurality of campaigns from at least one advertiser in a preset time period. For example, the computer system may obtain campaign delivery feed data when an impression, a click, a conversion, a video view complete event is detected by a cookie. The campaign delivery feed data may be collected in real time to a database and the computer system accesses the database periodically at a preset time interval. The campaign delivery feed data may include user identifications for all successful campaigns.

In act 520, the computer system obtains audience feed data including tag information from a data provider. The data provider may include at least one of the following: a publisher, an advertiser, and plurality of social networks. The computer system may use the user identifications to request the data provider to provide corresponding audience feed data that include tag information. The tag information may include audience segment names.

In act 530, the computer system clusters the tag information to find term frequencies for each term in the tag information. The goal of clustering is to leverage collective intelligence from all people who tag users by audience segment. The people may include engineers, data providers, researchers, business team members, and anyone who gives audience segment names to different audience segments and tag users with the audience segment names.

In act 540, the computer system identifies human understandable terms from the clustered tag information by removing noisy terms. There are at least two sources for noisy terms. The first one is from the people who first create the audience segments. For example, an engineer may use a name "AddThis-Home-Living Room" to an audience segment, in which the "AddThis" is an agency name or data provider name. The computer system may use intelligence from a search engine to check if any term in the segment name is an agency name. One way to do that is put the term into the search engine and check whether the search result page has a high term frequency of the words like "media," "advertising," etc.

The second source for noisy terms may be acronyms used internally by different teams in the data provider. For example, Yahoo! may use "YDSP" in the audience segment names. The computer system may create a black-list word filter to remove these arbitrary terms. The computer system may update the black-list periodically.

In act 550, the computer system selects a template based on the human understandable terms. The template may include one or two short paragraphs in a story telling format. The template may be generated using past report created under human supervision. The template may include a plurality of blanks to be filled using the meaningful parts identified by the computer system.

In act 560, the computer system combines the template with the human understandable terms to generate a human understandable report in a timely fashion. The human understandable terms may include high frequency terms in the initial clustering. The human understandable terms may further include deeper insights learned in each cluster. For example, the computer system may use "travel" to create a cluster that includes all segment names including the term "travel." Within the "travel" cluster, the computer system may use regular expressions to learn more details about travel such as the travel destinations such as Hawaii, Florida, etc.

The above acts may be repeated to get more conversions. For example, the acts may be repeated for each day or each week to update the allocation of the budget during each day or each week.

Figure 7:
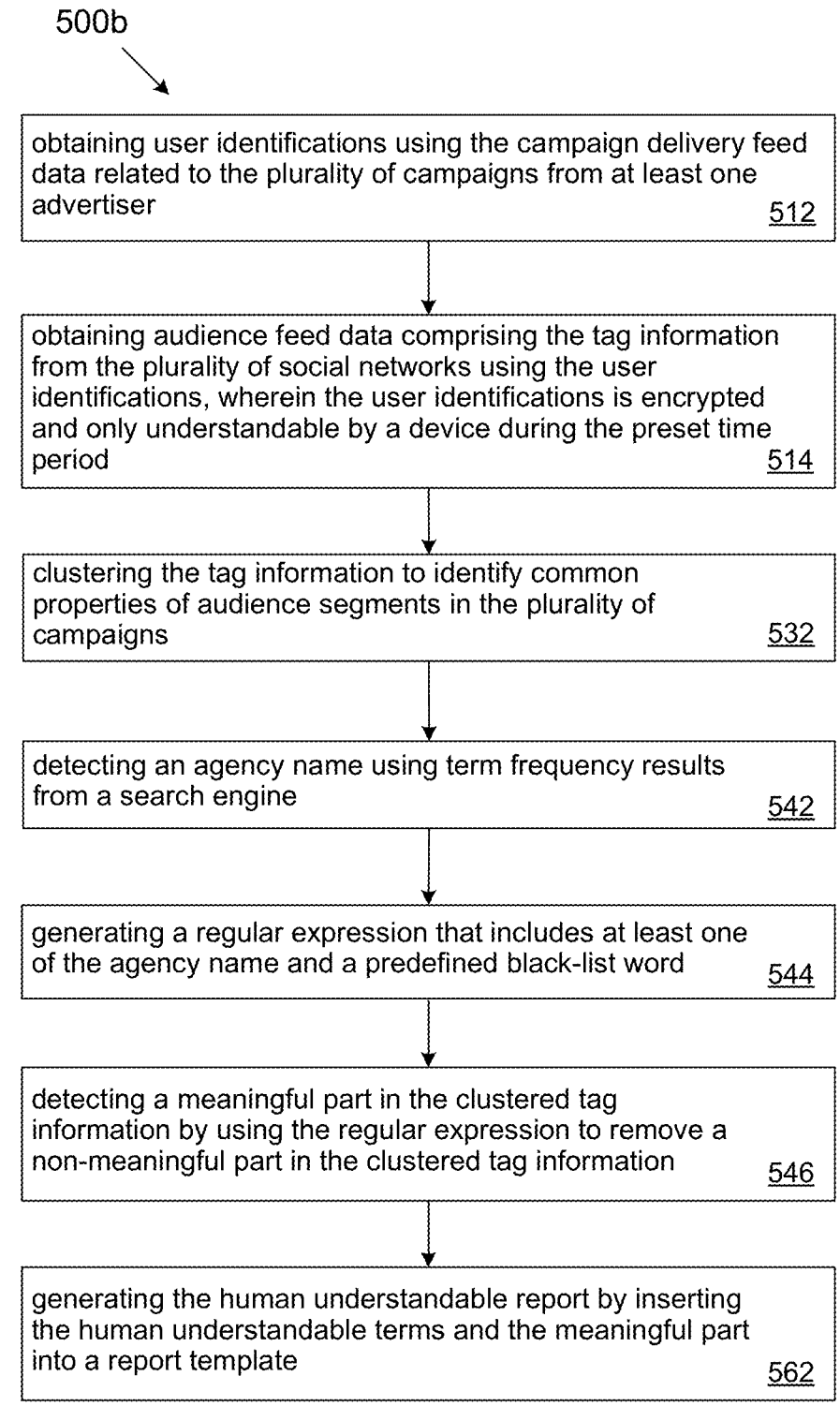
FIG. 7 is an example flow diagram illustrating embodiments of the disclosure.

FIG. 7 is an example flow diagram 500b illustrating embodiments of the disclosure. The acts in the example flow diagram 500b may be combined with the acts in the flow diagram 500a shown in FIG. 6. Similarly, the acts in flow diagram 500b may be implemented at least partially by a computer system that includes a server computer 300 disclosed in FIG. 3. The computer implemented method according to the example flow diagram 500b includes the following acts. Other acts may be added or substituted.

In act 512, the computer system obtains user identifications using the campaign delivery feed data related to the plurality of campaigns from at least one advertiser. The user identifications may include a code at least partially related to an online user profile of a user in the campaign delivery feed data. For example, the user identifications may include an email address, a login user name, etc.

In act 514, the computer system obtains audience feed data including the tag information from the plurality of social networks using the user identifications, wherein the user identifications is encrypted and only understandable by a device during the preset time period. To protect privacy information of the user, the user identifications may be encrypted so that it would be difficult for a human to know the identity of the user by looking at the user identification.

In act 532, the computer system clusters the tag information to identify common properties of audience segments in the plurality of campaigns. The computer system may cluster all the tag information and divide them to a plurality of clusters based on the high-frequency term included in the tags. Here, the tags may include the audience segment names from at least one of the data providers. This act may be included in act 530 in FIG. 6.

In act 542, the computer system detects an agency name using term frequency results from a search engine. This act may be included in act 540 in FIG. 6. The computer system may use intelligence from a search engine to check if any term in the segment name is an agency name. For example, the computer system may put the term into the search engine and check whether the search result page has a high term frequency of the words like "media," "advertising," etc.

In act 544, the computer system generates a regular expression that includes at least one of the agency name and a predefined black-list word. For example, if the agency name is "AddThis" and the black-list includes "ABBB" and "YDSP." The computer system may generate a regular expression including "AddThis*," "*ABBB*," or "*YDSP*." The computer system may further calculate high frequency N-Gram to identify high frequency terms such as "BlueKai Beverage," "Lover," and "AddThis Drink." The computer system may combine the high frequency terms and/or the terms from the black-list with "*" to generate the regular expression.

In act 546, the computer system detects a meaningful part in the clustered tag information by using the regular expression to remove a non-meaningful part in the clustered tag information. Following the above example, the remaining part that is matched by the regular expression, like Coffee, Beer, and Tea are the meaningful parts, which are human understandable terms.

In act 562, the computer system generates the human understandable report by inserting the human understandable terms and the meaningful part into a report template. The computer system may then generate a report including "A person, who like heath drinks, wine and beer." Following is an example illustrating the process.

Supposing the audience segment names include phrases like, "BlueKai Beverage Coffee Lover," "BlueKai Beverage Beer Lover," "AddThis Drink Tea Lover," and "AddThis Drink Beer Lover." "BlueKai" and "AddThis" are two data providers and they use different terms to tag similar groups. For example, BlueKai is using Beverage and AddThis is using Drink to tag people who like drink something.

During cluster process, supposing the above four phases are clustered together, which may be in the cluster of Beverage or Drink. The advertiser may want to find their different part inside the cluster for better targeting.

The computer system may take the following steps to generate the regular expression.

1). Generate NGram for each of the four phases, 2-gram could be like "BlueKai Beverage," "Beverage Coffee," and "Coffee Lover, for "BlueKai Beverage Coffee Lover."

2). Calculate high frequency N-Gram, for example, "BlueKai Beverage", "Lover", "AddThis Drink" are high frequent terms;

3). Combine the high frequency NGrams with "*", the computer system forms regular expressions, like "*BlueKai Beverage*" "*Lover*" and "*AddThis Drink*"

4). Identify the remaining part matched by the regular expression, like Coffee, Beer and Tea, which are the meaningful parts. Here, one phrase may match multiple regular expressions.

5). The remaining part (which match "*") are the interested parts why the phrases are in Beverage cluster. For example, because the user like Coffee, Tea or Beer, which is a more granular level of insights compared to just provide the cluster name "Beverage."

An example report looks like this: the people who speak Chinese, who are business productivity shopper, drive Honda, Hatchback, Wagon & Crossover, and Coupe Convertible Autos, who loves Chantix brand, and who like to drink Health Drinks, Wine and Beer, and who like to buy Health Drinks, Pet Food & Supplies, Dogs consumer packaged goods, and have insurance from Amica, are more likely to buy product from XXX company/products."

The solution in this disclosure is scalable by using audience segment as user daily habit dimensions, all kinds of display campaigns may provide all user qualified audience segments for all impressions, clicks and conversions. The solution is fast to generate report online by using three lookup tables: (1) clustering term dictionary table, (2) deeper attribute table, and (3) sentence annotation table. The three tables may be hash tables stored in a computer server. The clustering term dictionary table includes high frequency terms. The deeper attribute table is for each segment name, which may include the additional attribute besides the high frequency terms. The sentence annotation table may include strings representing sentence/paragraph to be presented to the account managers. They are all very small so that they may be stored locally and efficiently searched by the computer system.

The disclosed computer implemented method may be stored in computer-readable storage medium. The computer-readable storage medium is accessible to at least one hardware processor. The processor is configured to implement the stored instructions to index audience segments by keywords, so that the audience segments are searchable by keywords.

From the foregoing, it can be seen that the present embodiments provide a computer system that clusters the audience data to find the non-meaningful part of the segment tags. The computer system provides a solution to generate human understandable report about the campaign audiences using audience tag information from different sources across different platforms.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a processor and a non-transitory storage medium accessible to the processor;
   a memory storing a database comprising audience segments and tags related to the audience segments; and
   a computer server in communication with the memory and the database, the computer server programmed to:
      obtain campaign delivery feed data related to a plurality of campaigns from at least one advertiser in a preset time period;
      obtain audience feed data including tag information from a data provider, wherein the audience feed data is segmented into one or more audience segments;
      cluster the tag information to find term frequencies for each term in the tag information;
      generate a cluster group of audience feed data, the cluster group comprising audience feed data from across a plurality of different audience segments sharing a common high-frequency term;
      identify understandable terms from the clustered tag information by removing noisy terms from the cluster group; and
      generate a performance report by inserting the understandable terms into a report template.

2. The system of claim 1, wherein the computer server is programmed to obtain user identifications using the campaign delivery feed data related to the plurality of campaigns from at least one advertiser.

3. The system of claim 2, wherein the computer server is programmed to obtain audience feed data comprising the tag information from a plurality of social networks using the user identifications, wherein the user identifications is encrypted and only understandable by the computer server during the preset time period.

4. The system of claim 1, wherein the computer server is programmed to cluster the tag information to identify common properties of audience segments in the plurality of campaigns.

5. The system of claim 1, wherein the computer server is programmed to detect an agency name using term frequency results from a search engine.

6. The system of claim 5, wherein the computer server is programmed to generate a regular expression that includes at least one of the agency name and a predefined black-list word.

7. The system of claim 6, wherein the computer server is programmed to detect a meaningful part in the clustered tag information by using the regular expression to remove a non-meaningful part in the clustered tag information.

8. The system of claim 7, wherein the computer server is programmed to generate the performance report by inserting the understandable terms and the meaningful part into the report template.

9. A non-transitory storage medium configured to store processor executable instructions that, when executed by a processor, cause the processor to:
   obtain campaign delivery feed data related to a plurality of campaigns from at least one advertiser in a preset time period, the campaign delivery feed data comprising user identifications;
   obtain audience feed data including tag information from a data provider, wherein the audience feed data is segmented into one or more audience segments;
   cluster the tag information to find term frequencies for each term in the tag information;
   generate a cluster group of audience feed data, the cluster group comprising audience feed data from across a plurality of different audience segments sharing a common high-frequency term;
   identify understandable terms from the clustered tag information by removing noisy terms from the cluster group; and
   generate a performance report by inserting the understandable terms into a report template.

10. The non-transitory storage medium of claim 9, wherein the user identifications are encrypted and only understandable by a preset device during the preset time period.

11. The non-transitory storage medium of claim 9, further configured to store processor executable instructions that, when executed by the processor, cause the processor to:
   cluster the tag information to identify common properties of audience segments in the plurality of campaigns; and
   detect an agency name using term frequency results from a search engine.

12. The non-transitory storage medium of claim 11, further configured to store processor executable instructions that, when executed by the processor, cause the processor to:
   generate a regular expression that includes at least one of the agency name and a predefined black-list word;
   detect a meaningful part in the clustered tag information by using the regular expression to remove a non-meaningful part in the clustered tag information; and
   generate the performance report by inserting the understandable terms and the meaningful part into the report template.

* * * * *